United States Patent [19]
Brim et al.

[11] Patent Number: 5,152,525
[45] Date of Patent: Oct. 6, 1992

[54] BOWLING PIN ORIENTING AND DIRECTING SYSTEM

[75] Inventors: Ted E. Brim, Grand Haven, Mich.; Robert Aliesch, Hinwell, Switzerland; Enrico Ferrazza, Uri, Switzerland; Andreas Bretscher, Uster, Switzerland

[73] Assignee: Brunswick Bowling, Skokie, Ill.

[21] Appl. No.: 615,042

[22] Filed: Dec. 10, 1990

Related U.S. Application Data

[62] Division of Ser. No. 507,997, Apr. 11, 1990, Pat. No. 5,080,358.

[51] Int. Cl.⁵ .............................................. A63D 5/09
[52] U.S. Cl. ................................ 273/43 D; 273/43 E
[58] Field of Search ................. 273/43 R, 43 A, 43 D, 273/43 E

[56] References Cited

U.S. PATENT DOCUMENTS

| | | | |
|---|---|---|---|
| 2,767,984 | 10/1956 | Zuercher | 273/43 D |
| 2,821,395 | 1/1958 | Dumas | 273/43 A |
| 3,701,530 | 10/1972 | Broussard | 273/43 R |
| 3,966,206 | 6/1976 | Schmid | 273/43 D |
| 4,410,177 | 10/1983 | Richardson | 273/43 D |
| 4,813,673 | 3/1989 | Schmid | 273/43 |
| 4,913,445 | 4/1990 | Paxton | 273/43 D |

FOREIGN PATENT DOCUMENTS

| | | | |
|---|---|---|---|
| 1427597 | 12/1965 | France | 273/43 D |
| 6413019 | 5/1965 | Netherlands | 273/43 R |
| 0385697 | 3/1965 | Sweden | 273/43 R |

*Primary Examiner*—Paul E. Shapiro
*Assistant Examiner*—William M. Pierce
*Attorney, Agent, or Firm*—Wood, Phillips, Van Santen, Hoffman & Ertel

[57] ABSTRACT

A bowling pin orientating device usable with a pin distributing system comprising two spaced apart identical elements. Each element is somewhat elongated and has a pin receiving end, and opposite pin discharging end, and relatively upper and side pin orienting surfaces extending between the ends. The upper surface, near the pin receiving end is interrupted at a location closer to the receiving end than the discharging end by a projection that extends upwardly and away from the side surface. The side surface, at a location on the side of the projection closest to discharging end, has a diagonal lower section merging with a vertical upper additionally define a generous round between the receiving end the projection and a round with a progressively decreasing radius extends between and merges with the generous round and the diagonal and vertical sections of the side surface.

5 Claims, 4 Drawing Sheets

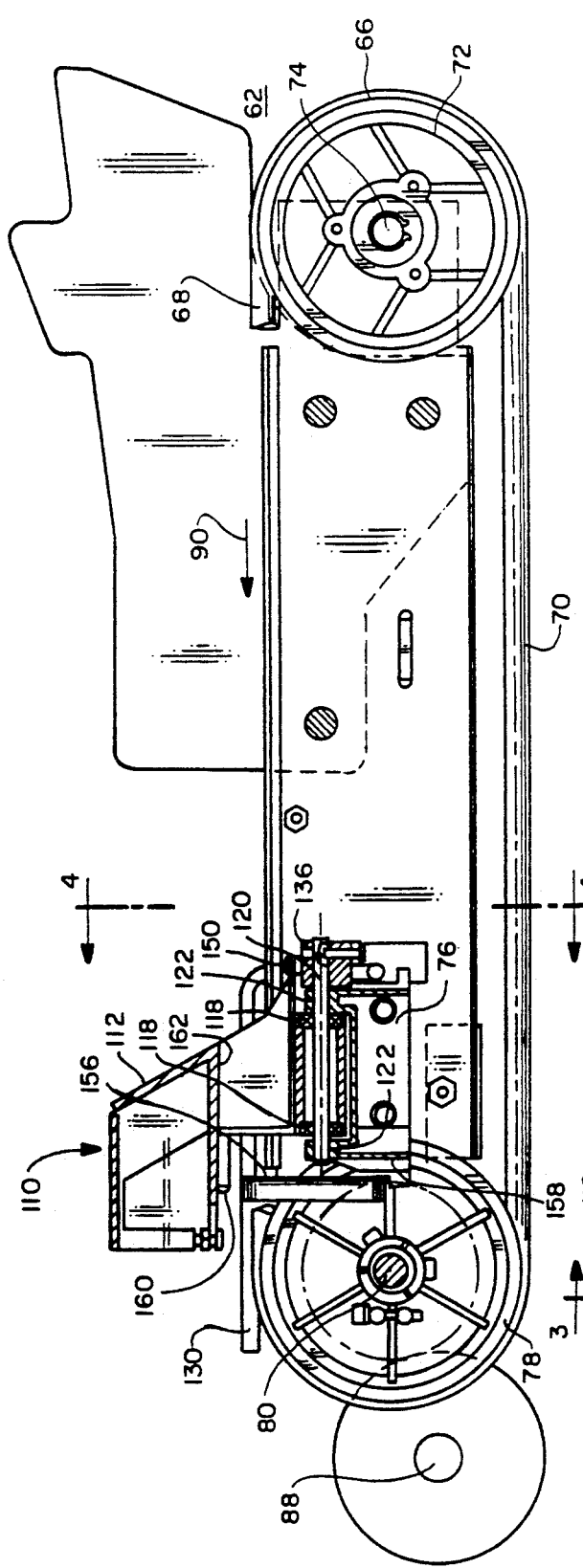
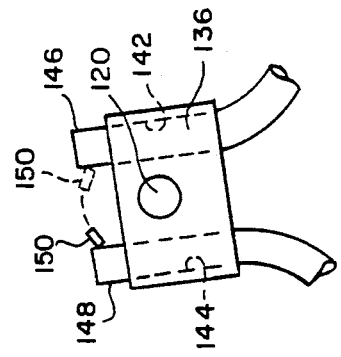
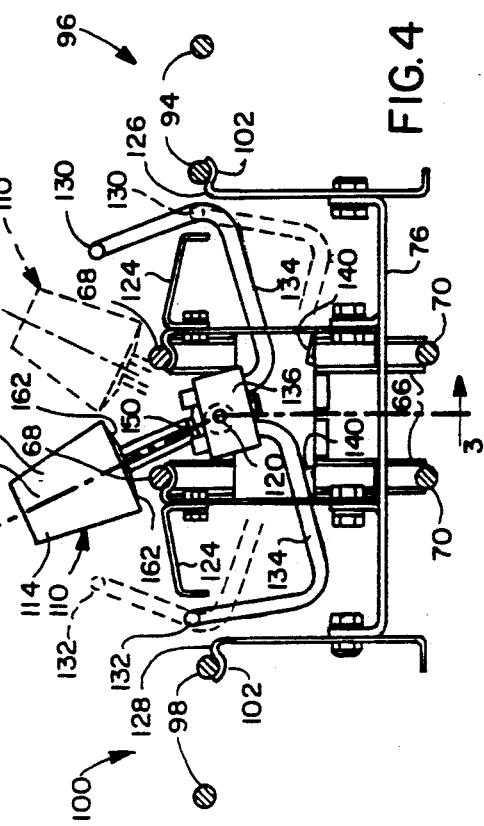

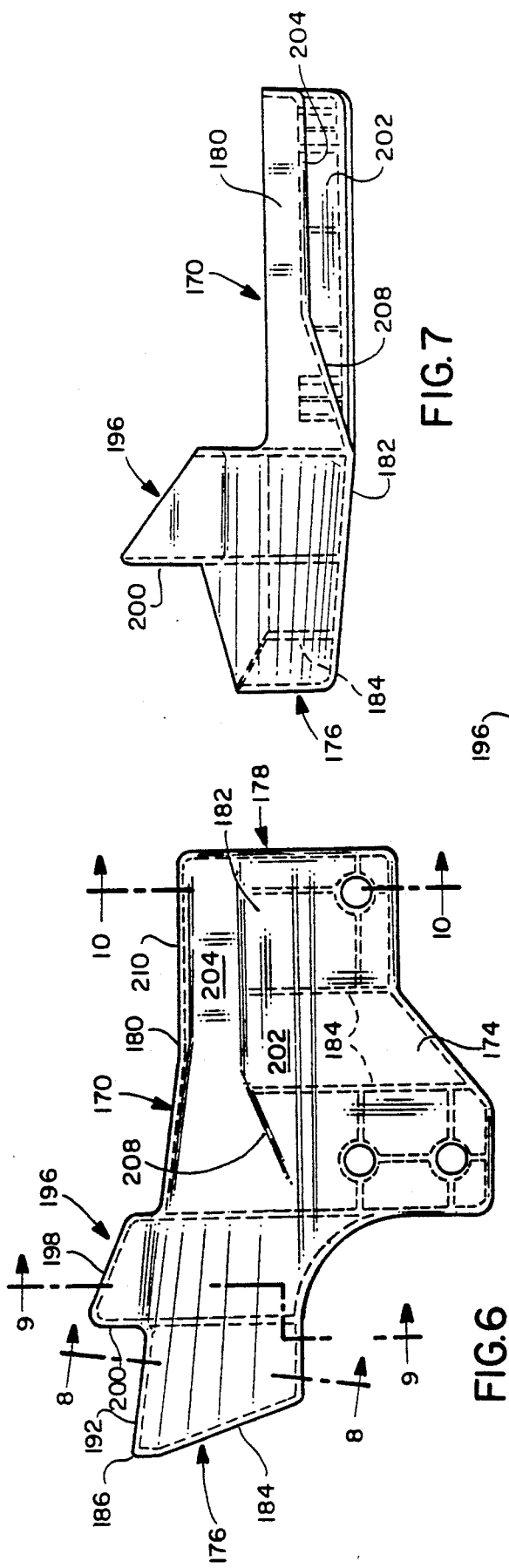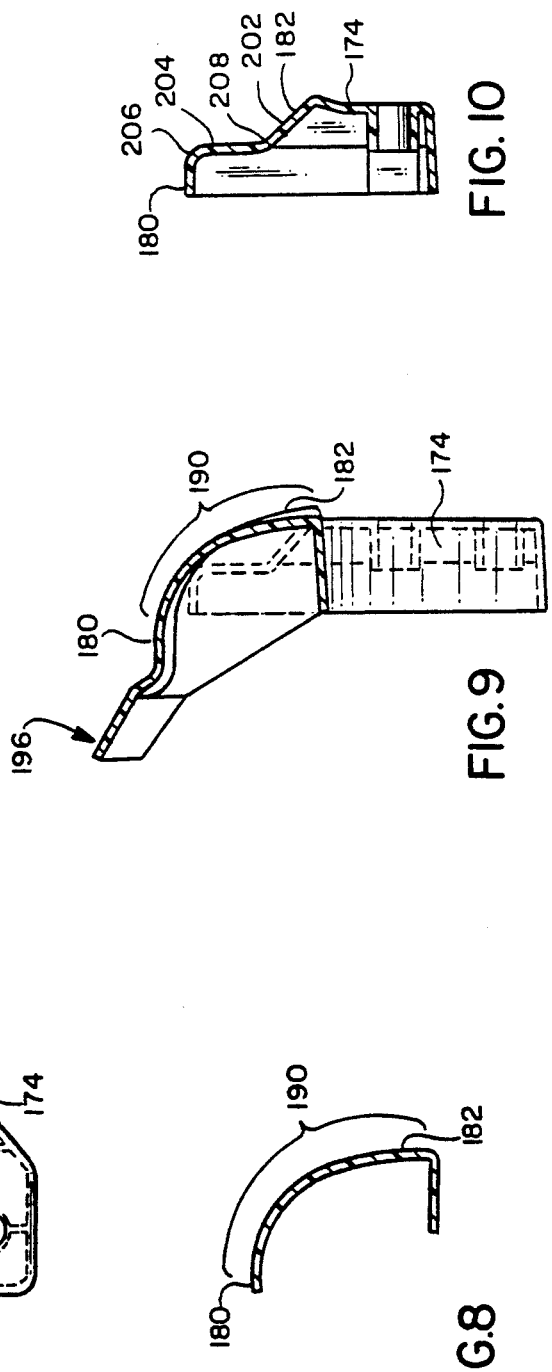

BOWLING PIN ORIENTING AND DIRECTING SYSTEM

This is a division of application Ser. No. 07/507,997, filed Apr. 11, 1990, now U.S. Pat. No. 5,080,358.

FIELD OF THE INVENTION

This invention relates to pinsetters or pin spotters for bowling pins, and more particularly, to an improvement in pin orienting devices and pin directing apparatus that are customarily located between a pin elevator and the pin deck of an automatic pin setting or pin spotting apparatus.

BACKGROUND OF THE INVENTION

Recent year have seen substantial commercialization of an automatic pinsetter of the sort generally illustrated in U.S. Pat. No. 3,810,617 issued May 14, 1974 to Schmid and Goems; U.S. Pat. No. 3,809,378 issued May 7, 1974 to Schmid and Goems; and U.S. Pat. No. 3,966,206 issued Jun. 29, 1976 to Schmid, the details of which are herein incorporated by reference.

More recently, U.S. Pat. No. 4,813,673 issued Mar. 21, 1989 to Schmid has disclosed an improved rapid moving and distribution apparatus for bowling pins. This particular apparatus is intended for use in pinsetters of the sort found in the previously identified patents and is intended to be interposed between the usual pin elevator which elevates fallen pins from the so called "pit" end of a bowling lane to the pin spotting deck which is utilized to respot pins. While the same is ideally suited for its intended purpose, there is a drawback associated therewith. In particular, in pinsetters of the sort mentioned, pins are received from the pin elevator and must be oriented and fed down to distribution paths, bottom end first. Since pins are coming from a single source (the pin elevator) but must be directed to two different locations, it is necessary to provide means whereby some of the pins are directed to one point and others are pointed to another point. Preferably, in order to prevent an absence of pins at one point from occurring, it is desirable that every other pin be directed to one of the two locations and the remainder to the other of the two locations.

In the apparatus disclosed in previously identified U.S. Pat. No. 4,813,673, pins from the pin elevator are oriented in the desired direction and then placed on the upper end of a diagonally extending chute which terminates at the two delivery points at its bottom. A distribution rocker is located intermediate the ends of the chute and serves to direct pins first into one distribution point and then into the other, in alternating fashion.

As mention, this system works well but does have the disadvantage of increasing the volume or bulk of the pin setting apparatus which it is used. Specifically, the requirement that the chute be diagonally placed with an upper end and a lower end increases the height of the apparatus in the vicinity of the chute and the pin elevator. Secondly, the nature of the distribution rocker disclosed requires that there be some substantial spacing in the horizontal direction between the pinsetter pin deck and the pin elevator.

These two factors not only require consideration in terms of placing the apparatus in a bowling establishment but result in added cost in manufacturing the pinsetter. Specifically, because of the spacial requirements, the pin elevator must be made of longer length than is need be and the usual pit conveyor (which conveys fallen pins to the bottom of the pin elevator) must likewise be made longer than needed.

The present invention is directed to overcoming one or more of the above problems.

SUMMARY OF THE INVENTION

It is the principle object of the invention to provide a new and improved distributing system for receiving bowling pins from a single source and distributing the pins so received to two spaced points. More particularly, it is an object of the invention to provide such a system wherein spacial requirements are minimized so as to allow reduction in the size, and thus the cost, of other components of, for example, an automatic pinsetter with which the system may be used.

It is also a principal object of the invention to provide a new and improved bowling pin orienting device usable with the pin distributing system as well as the individual elements for such a device so that pin handling reliability is improved dramatically.

According to a first facet of the invention, there is provided a pin distribution system which receives bowling pins moving in a predetermined path and intended to distribute the pins so received to spaced paths. The system includes an elongated first conveyor defining the predetermined path and having a discharge end from which bowling pins may be discharged. Second and third conveyors are located in spaced relation to one another and each has a pin receiving end in proximity to the discharge end of the first conveyor. The pin receiving ends are located on opposite sides of the discharge end of the first conveyor and a pin diverter is located between the pin receiving ends of the second and third conveyors at the discharge end of the first conveyor. Means are provided to mount the pin diverter for limited pivotal movement about an axis that may be horizontal or generally parallel to the direction of elongation of the first conveyor and between a first position for diverting pins from the discharge end to the second conveyor and a second position for diverting pins from the discharge end to the third conveyor.

According to a preferred embodiment of the invention, means are provided which are responsive to diversion of a bowling pin to the second conveyor for moving the diverter to the second position thereof along with means that are responsive to diversion of a bowling pin to the third conveyor for moving the diverter to its first position. In an preferred embodiment, the pivot axis for the diverter is horizontal and the diverter moves to opposite sides of a vertical plane.

According to one preferred embodiment of the invention, the diverter moving means comprise mechanical elements or sensors in the paths of diversion of pins from the first conveyor to the second and third conveyors and a linkage connects the mechanical elements to the diverter.

In a highly preferred embodiment, the linkage includes a lost motion connection.

In a highly preferred embodiment, the pin diverter is wedge-shaped and progressively widens as the discharge end of the first conveyor is approached.

The invention contemplates that the mechanical elements or pin sensors may comprise interconnected, spaced elements, pivotally mounted for rotation about an axis. In a preferred embodiment, the axis is the same pivot axis employed for the pin diverter.

In one embodiment of the invention, the pin diverter is located above the pivot axis and the spaced mechanical elements or sensors extend below the horizontal axis to act as counterweights for the pin diverter.

An over-center biasing means for biasing the pin diverter to either side of the vertical plane or to either one of the aforementioned positions may also be provided.

In a highly preferred embodiment, the first conveyor comprises two spaced belts, each having an upper run, and the pivot axis is located between the belts and below the upper runs.

The invention also contemplates the use of a pivot shaft to define the pivot axis. A sensor block is pivoted by the shaft for limited pivotal movement about the axis and means are provided for mounting the diverter on the shaft for limited pivotal movement thereon and relative to the sensor block. A limited lost motion connection extends between the diverter and the sensor block.

In one embodiment of the invention, the sensors extend oppositely from the sensor block and each extends towards an associated one of the pin receiving ends of the second and third conveyors to be engageable by a bowling pin diverted from the discharge end toward the associated pin receiving end of the second and third conveyors and to be moved by such pin to pivot the block, and through the limited lost motion connection, pivot the diverter between the before mentioned positions.

In one embodiment of the invention, the pin sensors are rods extending from the block.

In a highly preferred embodiment of the invention, the block includes spaced bores receiving the rods on opposite sides of the pivot shaft. The rods additionally extend out of the block to define two spaced posts on opposite sides of the pivot shaft and a projection on the pin diverter of lesser width than the spacing between the posts extends between the posts to define the limited lost motion connection.

The invention also contemplates the provision of an element for use in a bowling orienting device as may be employed between a pin elevator and a distribution system so that pins are fed from the elevator to the distributing system in a predetermined orientation. The element is somewhat elongated and has a pin receiving end, an opposite pin discharging end, and relatively upper and side pin orienting surfaces extending between the ends. The upper surface, near the pin receiving end is interrupted at a location closer to the receiving end than the discharging end by a projection that extends upwardly and away from the side surface. The side surface, at a location on the side of the projection closest to discharging end, has a diagonal lower section merging with a vertical upper section. The side surface and the upper surface additionally define a generous round between the receiving end the projection and a round with a progressively decreasing radius extends between and merges with the generous round and the diagonal and vertical sections of the side surface.

In a preferred embodiment, the vertical side surface merges with the upper surface with a small round.

Additionally, in a highly preferred embodiment, the upper surface, in the vicinity of the pin receiving, slopes slightly downwardly as the discharging end is approached.

In one embodiment, the radius of the generous round increases slightly from the receiving end to the projection.

The invention also contemplates that the projection have a length of at least about ten percent of the distance between the ends and an upper surface that slopes downwardly in the direction toward the discharging end.

Also provides is a pin orienting device that comprises two of the aforementioned elements, one being a mirror image of the other. The two face each other in spaced relation such that the side surfaces are spaced less than the width of a bowling pin and the facing surfaces of the projections are spaced more than the width of a bowling pin but less than the height thereof.

Other objects and advantages will become apparent from the following specification taken in connection with the accompanying drawings.

DESCRIPTION OF THE DRAWINGS

FIG. 3 is a vertical section taken approximately along the line 3—3 in FIG. 4;

FIG. 4 is a vertical section taken approximately along the line 4—4 in FIG. 3;

FIG. 5 is an enlarged, fragmentary view of a lost motion connection utilized in the invention;

FIG. 6 is an elevation of one element of pin orienting apparatus assembly;

FIG. 7 is a plan view of the element;

FIG. 8 is a sectional view taken approximately along the line 8—8 in FIG. 6;

FIG. 9 is a sectional view taken approximately along the line of 9—9 in FIG. 6;

FIG. 10 is a sectional view taken approximately along the line 10—10 in FIG. 6

Figure 1:
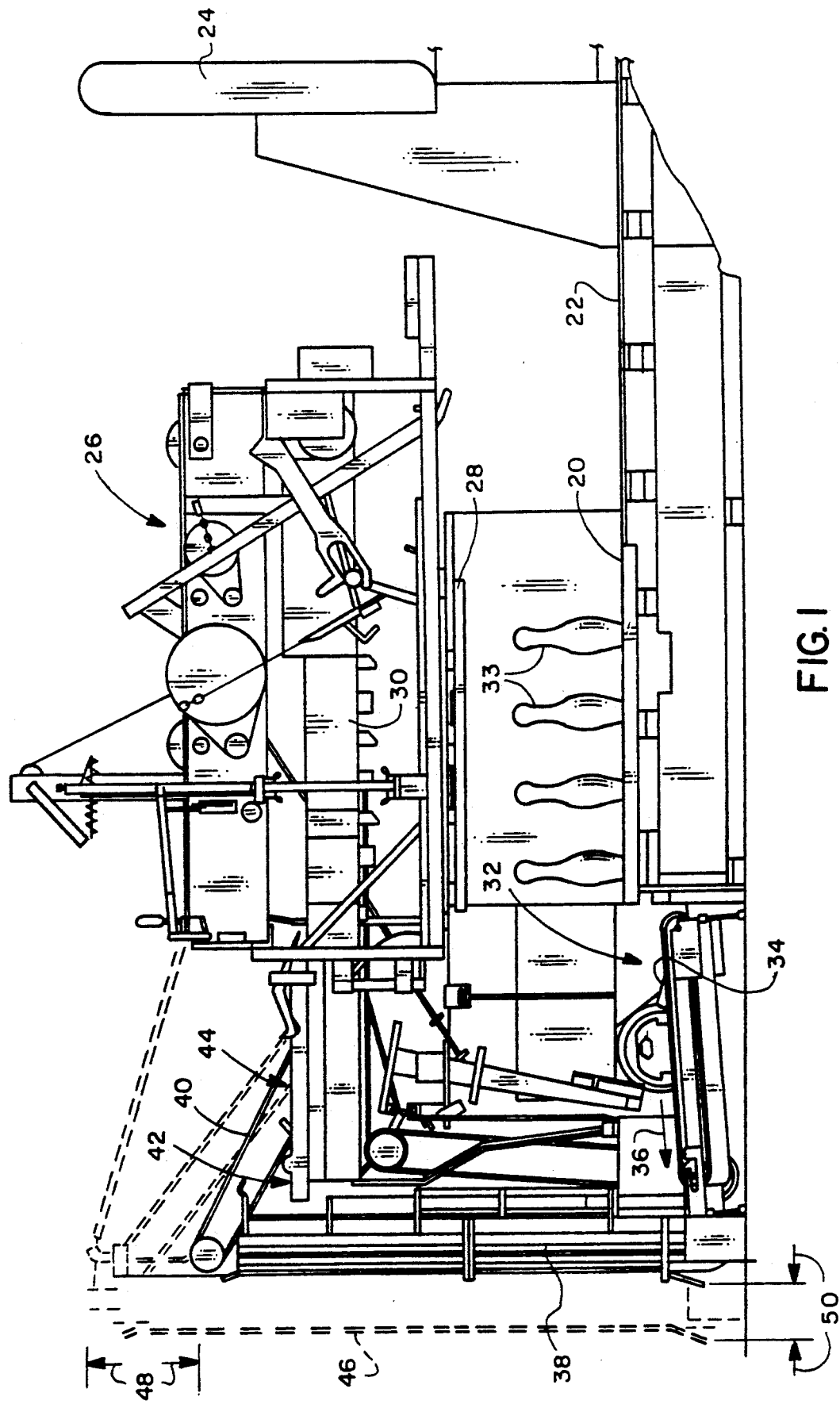
FIG. 1 is a side elevation of pinsetter embodying the pin distributing system and pin orienting device made according to the invention and additionally showing, in dotted lines, the envelope of prior art system not employing the invention for comparative purposes.

It is to be specifically observed that all figures of drawing, with the possible exception of FIG. 1, are drawn to scale.

DESCRIPTION OF THE PREFERRED EMBODIMENT

An exemplary embodiment of a pinsetter made according to the previously identified patents and with which the invention may be utilized is illustrated in FIG. 1 in overlying relation to the pin deck 20 of a conventional bowling lane 22. A masking unit 24 may be utilized to hide a pinsetter, generally designated 26, from the view of bowlers. The pinsetter 26 includes a conventional, vertically moveable spotting deck 28 which receives pins in a normal fashion from corresponding baskets or pockets or bins collectively given the reference numeral 30. As is well known, there is a pocket or bin for each of the pin positions and the pockets or bins are filled by pins moving on two spaced conveyors as will be described in greater detail hereinafter.

To the rear of the pin deck 20 is a so called pit, generally designated 32, into which bowling pins 33 are periodically swept by action of the pinsetter 26 or as a result of being impacted against by bowling ball (not shown).

Within the pit 32 is a pit conveyor 34 which is operative to move fallen pins in the direction of an arrow 36, that is, to the rear of the pit 32. Pins so delivered are received by a vertically extending pin elevator 38 driven by a belt 40. The pin elevator 38 raises the pins and then discharges them into a pin oriented device, generally designated 42 which in turn delivers the pins, base end first, to a pin distributing system, generally designated 44. The later, of course, delivers the pins to the pockets 30.

In FIG. 1, a dotted line shown at 46 indicates the silhouette of the pin elevator 38 in a prior art construction. The dimension illustrated by arrows 48 shows the decrease in height of the pin elevator 38 that may be achieved through use of the invention.

A dimension indicated by arrows 50 illustrates the reduction in length of the apparatus from front to rear generally, including the reduction in length of the pit conveyor 34 that may be achievable through the use of the invention.

Figure 2:
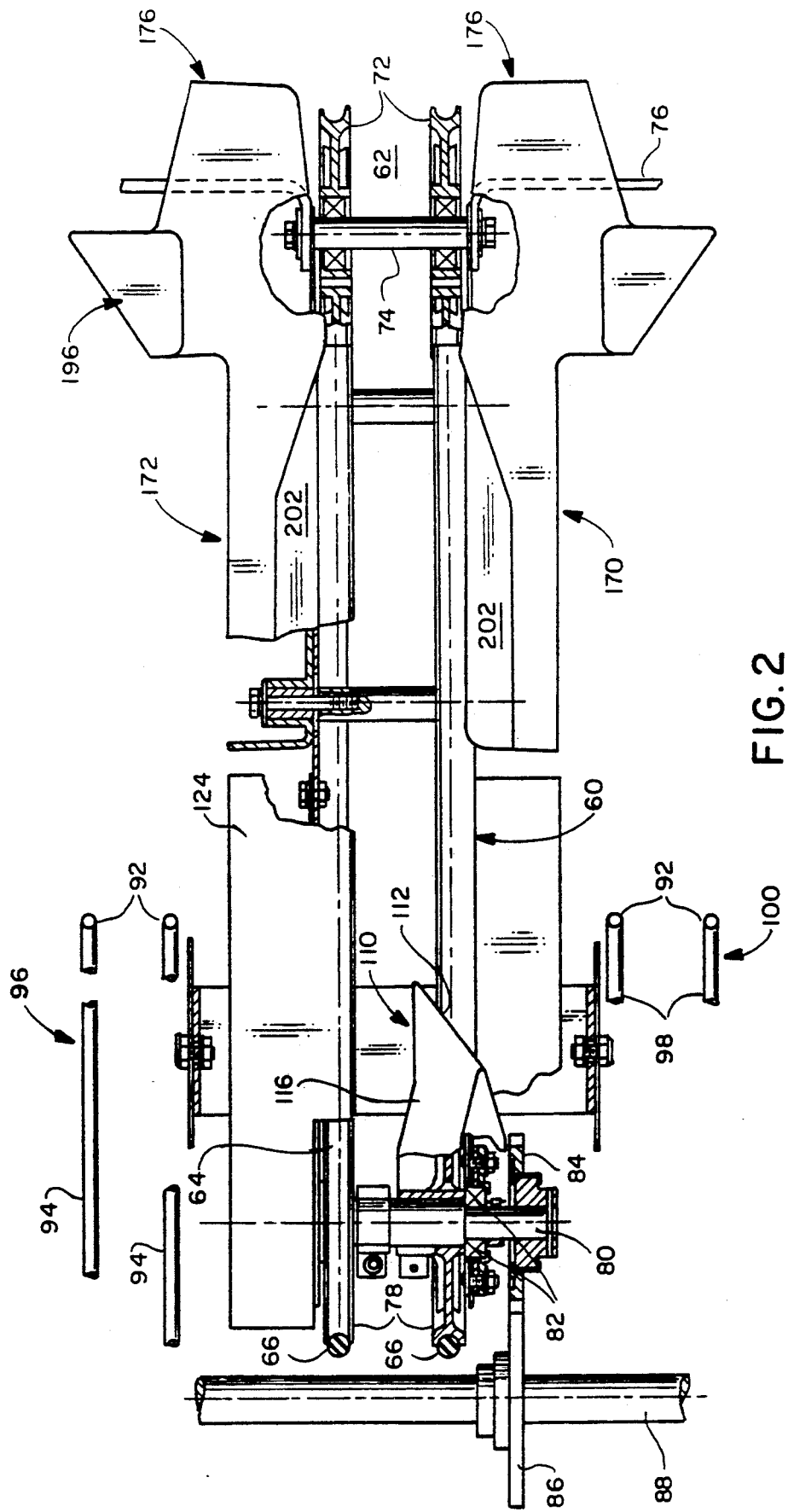
FIG. 2 is a plan view of the pin distributing system and pin orienting device with parts broken away and shown in section for clarity.

Turning now to FIGS. 2, 3 and 4, the pin distribution system of the invention will be described in greater detail. The pin distribution system is made up of a first conveyor, generally designated 60, having a pin receiving end 62 and a pin discharging end 64. The conveyor 60 is elongated and is made up of two spaced belts 66. As seen in FIGS. 3 and 4, the belts 66 have upper runs 68 and lower runs 70. The same are trained about sheaves 72 journalled on a shaft 74 mounted to part of the apparatus frame 76 at the pin receiving end 62. Similar sheaves 78 at the discharge end 64 also receive the belts 66. The sheaves 78 are fixed to a shaft 80 journalled by bearings 82 to the frame 76. The shaft 80 mounts a gear 84 meshed with a gear 86 rotatable with a shaft 88. The shaft 88 is driven by any suitable mean so that the upper runs 68 of the belt 66 move in the direction of an arrow 90 as seen in FIG. 3.

Additional sheaves 92 totaling four in number are paired on opposite sides of the belts 66 adjacent the discharge end 64 of the first conveyor 60. One pair of the sheaves 92 on one side of the belts 66, along with two sheaves not shown, mounts spaced belts 94 which define a second conveyor, generally designated 96 while similar belts 98 on the pair of sheaves 92 on the opposite side of the belts 66, also along with two sheaves not shown, define a third conveyor 100. The second conveyor 96 and the third conveyor 100 are adapted to received bowling pins discharged from the first conveyor 60 as will be seen.

The belts 66, 94, and 98 are spaced apart a distance less than the width of a blowing pin head and may be made of any suitable elastomer. To insure that the same do not sag under the weight of bowing pins, upwardly opening, elongated arcuate guides 102 suitably mounted to the frame 76 may be provided for each of the upper runs of the respective belts.

To divert the pins from the first conveyor 60 to either the second conveyor 96 or the third conveyor 100, the system includes a pin diverter, generally designated 110. The pin diverter 110 is located at the discharge end 64 of the first conveyor 60 and between the second and third conveyors 96 and 100. As illustrated in the drawings, the same is generally wedge-shaped and includes a leading edge 112 that extends diagonally upwardly and rearwardly in relation to the first conveyor 60. Opposite faces 114 and 116 diverge (FIG. 4) from one another and from the edge 112 from front to rear. The edge 112 is, of course, located above the upper runs 68 of the belts 66 so as to be engageable by bowling pins carried thereby. Below the upper runs 66, bearings 118 carried by the pin diverter 110 journalled the same on a pivot shaft 120 which in turn in journalled as by bearings 122 to the frame 76 of the machine. The pivot shaft 120 defines a pivot axis for the pin diverter 110 that is parallel to the direction of elongation of the first conveyor 60 and which preferably is contained within a horizontal plane. As best seen in FIG. 4, the pin diverter 110 is movable between solid and dotted line positions to either side of a vertical plane containing the pivot axis defined by the pivot shaft 120. In the solid line position illustrated in FIG. 4, the pin diverter 110 will be operative to divert a pin on the first conveyor 60 to the second conveyor 96. When the pin diverter 110 is in the dotted line position, such a pin will be diverted to the third conveyor 100. Shifting of the pin diverter 110 about the pivot axis defined by the shaft 120 may be accomplished by motors such as solenoids, but in the preferred embodiment, by mechanical sensors.

Sheet metal ramps 124 extend generally from the upper runs 68 of the belts 66 towards corresponding runs of the conveyors 96 and 100. The extension, however is such as to leave gaps 126 and 128 respectively between the ramps 124 and the second and third conveyors 96 and 100. A generally horizontally extending rod 130 is movable from the solid line position illustrated in FIG. 4 above the ramp 124 to a position within the gap 126 shown in dotted lines. A similar horizontally extending rod 132 is disposed within the gap 128 and may be movable to the dotted line position above the other ramp 124. The rods 130 and 132 move conjointly and by means of integral bale-like elements 134, are mounted to a sensor block 136 which is pinned to the pivot shaft 120. Consequently, when the rod 132 is in the gap 128, the rod 130 will be above its associated ramp 124 as illustrated in solid lines in FIG. 4. Conversely, when the rod 132 is above its ramp 124, the rod 130 will be in the gap 126 as illustrated in dotted lines in FIG. 4. Movement between such positions is limited by means of stops 140 suitably mounted to the frame and which are engaged by the bails 134.

The sensor block 136 includes first and second bores 142 and 144 which receive respective ends 146 and 148 of the bails 134 associated respectively with the rods 130 and 132. As best seen in FIG. 5, the ends 146 and 148 extend out of the block 136 to define two spaced posts, one on each side of pivot shaft 120.

Just above the bearings 118, the pin diverter 110 carries a forwardly extending projection 150. The projection 150 extends between the posts defined by the ends 146 and 148 and is narrower than the spacing between the two. Either one of the ends 146 or 148 may engage the projection 150 as a result of rotation of the sensor block 136 with the pivot shaft 120. When such occurs, continued rotation will cause the pin diverter 110 to be driven in the same rotational direction by reason of interference between the projection 150 and the corresponding rod end 146 or 148. Thus, the ends 146 and 148 and the projection 150 define a connection whereby the sensor rods 130 and 132 are linked, in driving relation, to the pin diverter 110 through a limited lost motion connection defined by the ends 146 and 148 and the projection 150 because of the aforementioned sizing.

Preferably, a spring 156 has an end 158 mounted to the frame 76 and an opposite end 160 mounted to the pin diverter 110 well above the pivot axis defined by the shaft 120. The end 158 is below the pivot axis 120 and as a result, an over center mechanism is defined whereby one the pin diverter 110 is moved past the vertical plane referred to previously, the spring 156 will act to bias the pin diverter 110 toward the position it is approaching.

Considering the configuration of the components illustrated in FIG. 2, 3, and 4, a pin approaching the pin diverter 110 on the first conveyor 60 will engage the face 116 of the pin diverter 110 and by reason of the wedged-shaped configuration of the pin diverter, the pin will be cammed in the direction of the second conveyor 96. At this time, the sensor rod 130 will be above the ramp 124 in the solid line position illustrated in FIG. 4. As the pin moves from the first conveyor 60 and onto the ramp 124 between the first conveyor 60 and the second conveyor 96, it will roll against the rod 130 and that in turn will drive the rod 130 from the solid line position illustrated in FIG. 4 to the dotted line position. This in turn will cause pivoting of the sensor block 136, and ultimately, through the lost motion connection defined by the ends 146 and 148 and the projection 150, the movement of the pin diverter 110 to the dotted line position illustrated in FIG. 4.

This action will also result in the rod 132 being moved to a position overlying the ramp 124 interposed between the first conveyor 60 and the third conveyor 100. The next succeeding pin moving on the conveyor 60 will encounter the face 114 of the pin diverter 110 and be cammed toward the third conveyor 110. As the pin leaves the first conveyor 60 and begins to roll on the ramp 124, it will encounter the rod 132 and drive it from the dotted line position shown in FIG. 4 to the solid line position. This in turn will pivot the sensor block 136 and ultimately drive the pin diverter 110 back to the solid line position illustrated in FIG. 4.

This alternating relationship will occur for as long as pins are being delivered along the first conveyor 60. In some instances, it might be desirable to provide a solenoid connection to the pin diverter 110 so that the mechanical indexing of the same by the mechanism just described can be interrupted by indexing movement in either direction by operation of such a solenoid.

Advantageously, provision of the lost motion connection between the sensor block 136 and the pin diverter 110 prevents what might be termed as "double indexing". Double indexing occurs when a pin causes the pin diverter 110 to move from one position to another and rebound back to the original position without being directed thereto by the passage of another pin. The lost motion connection tends to absorb energy in the system that might cause such double indexing to occur.

It should also be noted that because the bails 134 are located below the pivot shaft 120, and the pin diverter 110 is above the pivot shaft 120, the former tend to act as counterweights for the latter to provide smooth operation. Extending the bails 134 between the upper and lower runs 68 and 70 of the first conveyor 60 provides a compact assembly. By locating notches or reliefs 162 below the faces 114 and 116 of the pin diverter 110, maximum movement of the pin diverter 110 to either side of the previously mentioned vertical plane is obtained. That is, the reliefs 162 prevent interference between the pin diverter 110 and the upper runs 68 of the belts 68 except when the pin diverter 110 has traveled to the desired position sufficient to divert a pin.

This arrangement, it has been found, allows the pin elevator 38 (FIG. 1) to be shortened by eighteen inches. That is to say, the dimension shown at 58 in FIG. 1 is about eighteen inches. Similarly, ten inches is cut off the length of the machine which also means a reduction in the length of the pit conveyor 34 of approximately 10 inches. That is to say, the dimension shown at 50 in FIG. 10 is about ten inches. It can readily be appreciated that the volume savings are desirable strictly from a space standpoint but by reducing the length of both the pin elevator 38 and the pit conveyor 34, additional savings in the cost of these items are also obtained.

The invention also provides an improved pin orienting device to assure that pins received from the pin elevator 38 are properly placed on the first conveyor 60. This is achieved by locating two spaced pin orienting elements, generally designated 170 and 172, on opposite sides of the first conveyor 60 at the pin receiving end 62 thereof. The elements 170 and 172 are mirror images of one another and thus, only the element 170 will be described. Referring first to FIG. 6 and 7, the element 170 is seen to be an integral, molded part formed of high impact plastic or the like. The same is somewhat elongated and includes a base 174 by which the same may be mounted to the frame 76 of the apparatus in the manner illustrated in FIG. 3. The element 170 also includes a pin receiving end, generally designated 176, and an opposite pin discharging end, generally designated 178. Extending between the ends 176 and 178 is an upper, pin contacting and orienting surface 180 and a pin contacting and orienting side surface 182. Oppositely of the surfaces 180 and 182, the element 170 is somewhat concave and is provided with strengthening ribs 184 at the various locations illustrated.

As viewed in FIG. 6, the pin receiving end 176 includes a diagonal surface 185 that extends upwardly and away from the base 170 to a corner 186. In this general location, and as best seen in FIG. 8, the upper surface 180 and the side surface 182 form a generous round 190. As also can be seen in FIG. 6, the upper surface 180 slopes gently downwardly as at 192 from the end 176 toward the end 178 for approximately ⅔ of the length of the element 170.

As can also be appreciated from a consideration of FIG. 7 and 9, the radius of the round 190 increases slightly from the receiving end 176 to a projection, generally designated 196, that interrupts the upper surface 180. The projection 196 extends diagonally upwardly and away from the side section 202. In addition, its upper extremity 198 slopes downwardly toward the end 178 at a somewhat greater angle than that part 192 of the upper surface 180. The projection 196 also includes a transverse face 200 facing the end 176. Further, the length of the projection 196 is at least about ten percent of the total length of the distance between the ends 176 and 178. The projection 196 is also located closer to the end 176 than to the end 178 as clearly illustrated in FIG. 6 and 7.

On the side of the projection 196 closest the end 178, the side surface 182 has a diagonal section 202 joined to an upper vertical section 204. The diagonal surface 182 is directed upwardly and away from the base 174 while the vertical section 204 merges with the upper surface 180 with a small round 206. A junction line 208 between the diagonal 202 in the vertical section 204 is clearly visible in FIG. 6. After running approximately parallel to the flat section 210 of the upper surface 180, the same move downwardly towards the base as the projection 196 is approached. Thus, it will be appreciated that the radius of the generous round 190 progressively decreases from the projection 196 toward the end 178 as the same merges with the diagonal section 202 and the vertical section 204.

As perhaps best illustrated in FIG. 2, the spacing is such that the vertical sections 204 of the side surface 182 are spaced sufficiently as to receive the belly of a bowling pin while the diagonal sections 202 are such as to offer a certain degree of guidance to such a bowling pin while its belly is disposed on the upper runs of the 68 of the belt 66. The projections 196 are spaced apart a distance greater than the width of a bowling pin but less than the length thereof. In the usual case, a bowling pin will be delivered to the pin receiving end 176 of the elements 170 and 172 in a orientation generally transverse to the direction of elongation of those elements as well as the direction of elongation of the first conveyor 60. The pin will typically span the elements 170 and 172 and be resting on the surface 192. Because the same is slightly sloped, the pin will tend to roll toward the faces 200 of the projections 196 and engage the same. Because of its greater mass, the belly section of the pin will have greater inertia than the head end of the pin with the result that the head end of the pin will be retarded in its movements by whichever one of the faces 200 it has engaged. The base of the pin will continue to descend past the projection 196 that it may have engaged. Consequently, the base end of the pin will be the first end to enter the conveyor 60 which is the desired result.

It will be readily appreciated that the elements 170 and 172 may be fitted closely about the conveyor 62 and extend from its pin receiving ends 62 substantially to its discharge end. Because of the positive orienting effected as mentioned previously, the dimensions of the elements 170 and 172 may be relatively short thus further facilitating the aforementioned space saving and overall length of the machine.

We claim:

1. An element for use in a bowling pin orienting device, said element being somewhat elongated and having a pin receiving end, an opposite pin discharge end, and an upper, pin contacting and orienting surface and a pin contacting and orienting side surface, said pin orienting surfaces extending between said ends; said upper surface near said receiving end sloping slightly downwardly toward said discharge end and said upper surface, at a location closer to said receiving end than said discharging end, including a projection extending upwardly from said upper surface and away from said side surface;

said side surface, at a location on the side of said projection closest said discharging end, having a diagonal, lower section merging, with a vertical upper section which in turn merges with said upper surface with a small round, said side surface and said upper surface defining a generous round between said receiving end and said projection and a round with a progressively decreasing radius extending between and merging with said generous round an diagonal and vertical sectional.

2. The element of claim 1 is wherein the radius of said generous round increases slightly from said receiving end to said projection.

3. The element of claim 1 wherein said projection has a length of at least about 10% of the distance between said ends and an upper surface that slopes downwardly in the direction toward said discharging end.

4. A pin orienting device comprising two of the elements of claim 1, one being a mirror image of the other and facing the other in spaced relation symmetrically positioned about a plane separating the two elements such that said side surfaces are spaced less than the width of a bowling pin and the facing surfaces of said projection are spaced more than the width of a blowing pin but less than the height thereof.

5. An element for use in a bowling pin orienting device, said element being somewhat elongated and having a relatively upper and side pin orienting surfaces extending between said ends;

said upper surface, near said receiving end, being interrupted at a location closer said receiving end than said discharge, end by a projection extending upwardly and away from said side surface; said side surface, at a location on the side of said projection closest said discharging end, having a diagonal lower section merging with a vertical upper section, said side surface and said upper surface defining a generous round between said receiving end a sand projection and a round with a progressively decreasing radius extending between and merging with said generous round and diagonal and vertical sections.

* * * * *